US011711691B2

(12) United States Patent
Gundavelli et al.

(10) Patent No.: US 11,711,691 B2
(45) Date of Patent: Jul. 25, 2023

(54) APPLYING NETWORK POLICIES ON A PER-USER BASIS

(71) Applicant: Cisco Technology, Inc., San Jose, CA (US)

(72) Inventors: Srinath Gundavelli, San Jose, CA (US); Vimal Srivastava, Karnataka (IN); Warren Scott Wainner, Sterling, VA (US); Aeneas Sean Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 290 days.

(21) Appl. No.: 17/112,264

(22) Filed: Dec. 4, 2020

(65) Prior Publication Data
US 2022/0182826 A1 Jun. 9, 2022

(51) Int. Cl.
H04W 4/00 (2018.01)
H04W 12/06 (2021.01)
H04W 76/11 (2018.01)
H04W 76/15 (2018.01)
H04W 28/02 (2009.01)

(52) U.S. Cl.
CPC ..... *H04W 12/068* (2021.01); *H04W 28/0273* (2013.01); *H04W 76/11* (2018.02); *H04W 76/15* (2018.02)

(58) Field of Classification Search
CPC ........... H04W 12/068; H04W 28/0273; H04W 76/11; H04W 76/15; H04W 8/20; H04W 84/12; H04W 88/10
See application file for complete search history.

(56) References Cited

U.S. PATENT DOCUMENTS

| 2004/0053613 | A1* | 3/2004 | Karaoguz | H04W 4/24 455/411 |
| 2010/0106966 | A1* | 4/2010 | Santos | H04L 12/66 370/328 |
| 2014/0029421 | A1 | 1/2014 | Rajagopalan et al. | |
| 2016/0094662 | A1* | 3/2016 | Kollu | H04L 45/745 709/224 |
| 2017/0164212 | A1 | 6/2017 | Opsenica et al. | |

(Continued)

OTHER PUBLICATIONS

RS-Tech, "What is the 5G CPE?", Router Switch Blog, Feb. 3, 2020, 6 pages.
Blogspot, "5G Stuff", Apr. 13, 2018, 3 pages.

*Primary Examiner* — Omoniyi Obayanju
(74) *Attorney, Agent, or Firm* — Edell, Shapiro & Finnan, LLC

(57) ABSTRACT

In one example, an Access Point (AP) configures a first mapping of a first cellular network connection to a first local access network group, and further configures a second mapping of a second cellular network connection to a second local access network group. The AP determines whether a user device is authorized to use the first cellular network connection or the second cellular network connection. If the user device is authorized to use the first cellular network connection, the AP associates, for the user device, a first user device identifier with the first local access network group. If the user device is authorized to use the second cellular network connection, the AP associates, for the user device, a second user device identifier with the second local access network group.

20 Claims, 5 Drawing Sheets

(56) References Cited

U.S. PATENT DOCUMENTS

2017/0344703 A1 11/2017 Ansari et al.
2019/0223023 A1 7/2019 Altay et al.
2020/0015046 A1 1/2020 Wong et al.

* cited by examiner

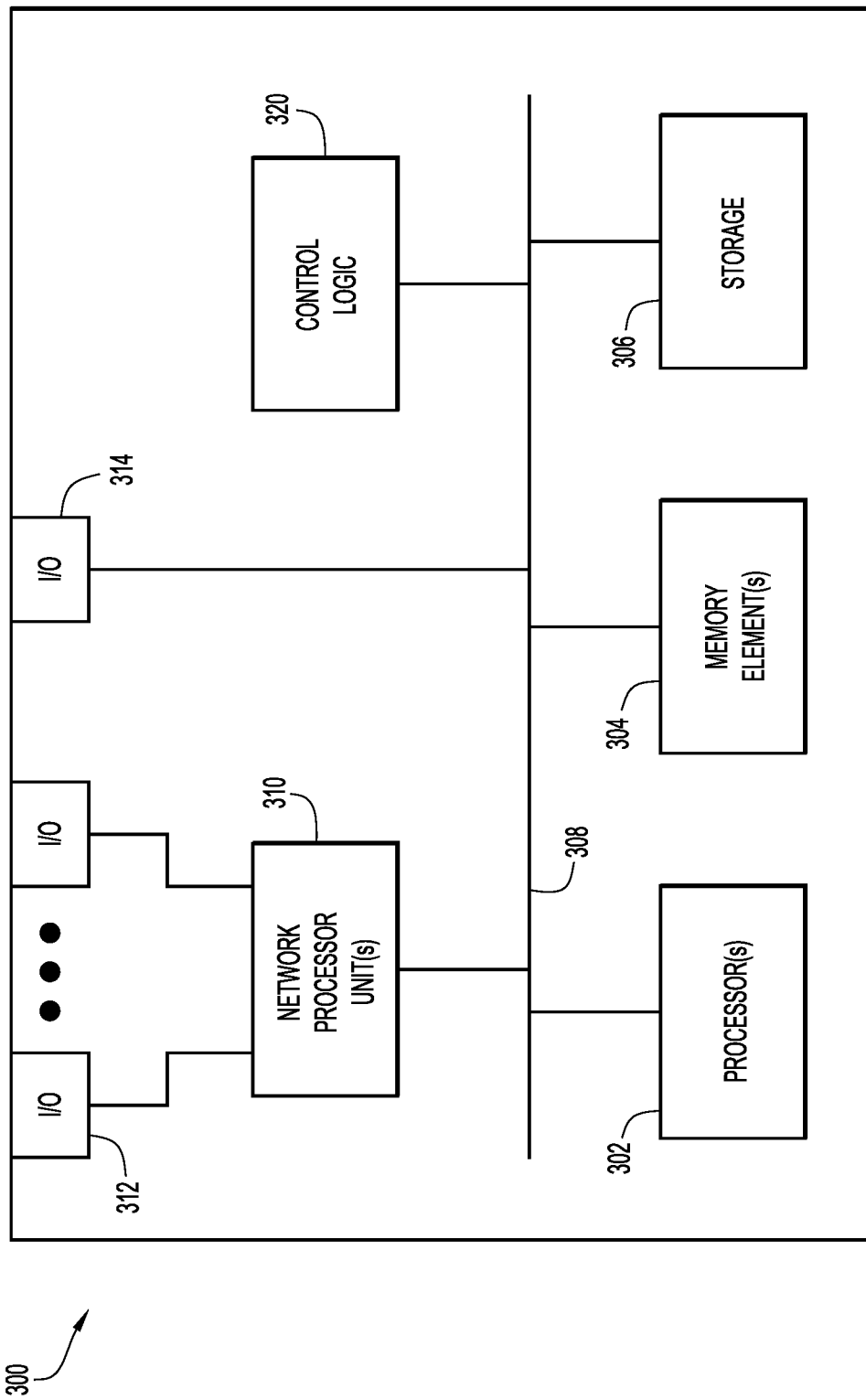

APPLYING NETWORK POLICIES ON A PER-USER BASIS

TECHNICAL FIELD

The present disclosure relates to telecommunications technology.

BACKGROUND

An Access Point (AP) provides network connectivity to one or more user devices by transmitting network traffic to/from the one or more user devices. An AP can provide network connectivity using various telecommunications standards such as Wi-Fi®, 3rd Generation Partnership Project (3GPP) technology, etc. In some instances, an AP can translate network traffic between different types of telecommunications standards.

BRIEF DESCRIPTION OF THE DRAWINGS

FIG. 3 illustrates a hardware block diagram of a computing device configured to perform functions associated with operations discussed herein, according to an example embodiment.

DESCRIPTION OF EXAMPLE EMBODIMENTS

Overview

In one example embodiment, an Access Point (AP) configures a first mapping of a first cellular network connection to a first local access network group, and further configures a second mapping of a second cellular network connection to a second local access network group. The AP determines whether a user device is authorized to use the first cellular network connection or the second cellular network connection. If the user device is authorized to use the first cellular network connection, the AP associates, for the user device, a first user device identifier with the first local access network group. If the user device is authorized to use the second cellular network connection, the AP associates, for the user device, a second user device identifier with the second local access network group.

Example Embodiments

Conventionally, different network policies would be applied to a user device depending on whether the user device is directly connected to a cellular network via a cellular telecommunications standard or indirectly connected to a cellular network via a non-cellular telecommunications standard (e.g., Wi-Fi). Consider, for instance, a first user who is using a 5G User Equipment (UE) that is directly connected to a cellular network and a Wi-Fi tablet that is indirectly connected to a cellular network. A conventional system would apply different network policies to the 5G UE and the Wi-Fi tablet even though the same user is using both user devices.

This inconsistency may occur in conventional systems because a cellular network connection is negotiated and connected to the appropriate service based on the connecting user device. However, the connecting user device may not be the owner of the Access Point (AP) equipment providing the indirect connection, and as such the appropriate network policies may not be applied to the traffic associated with the user device.

Accordingly, techniques are provided that enable network policies to be applied on a per-user basis, rather than based on individual user devices or a given network connection. Applying these techniques to the aforementioned example may permit a system to enable the same network policies to the directly-connected 5G UE and the indirectly-connected Wi-Fi tablet, for example. Moreover, different network policies may be applied to one or more user devices used by a second user, regardless of whether those user devices are directly or indirectly connected to the cellular network.

Figure 1:
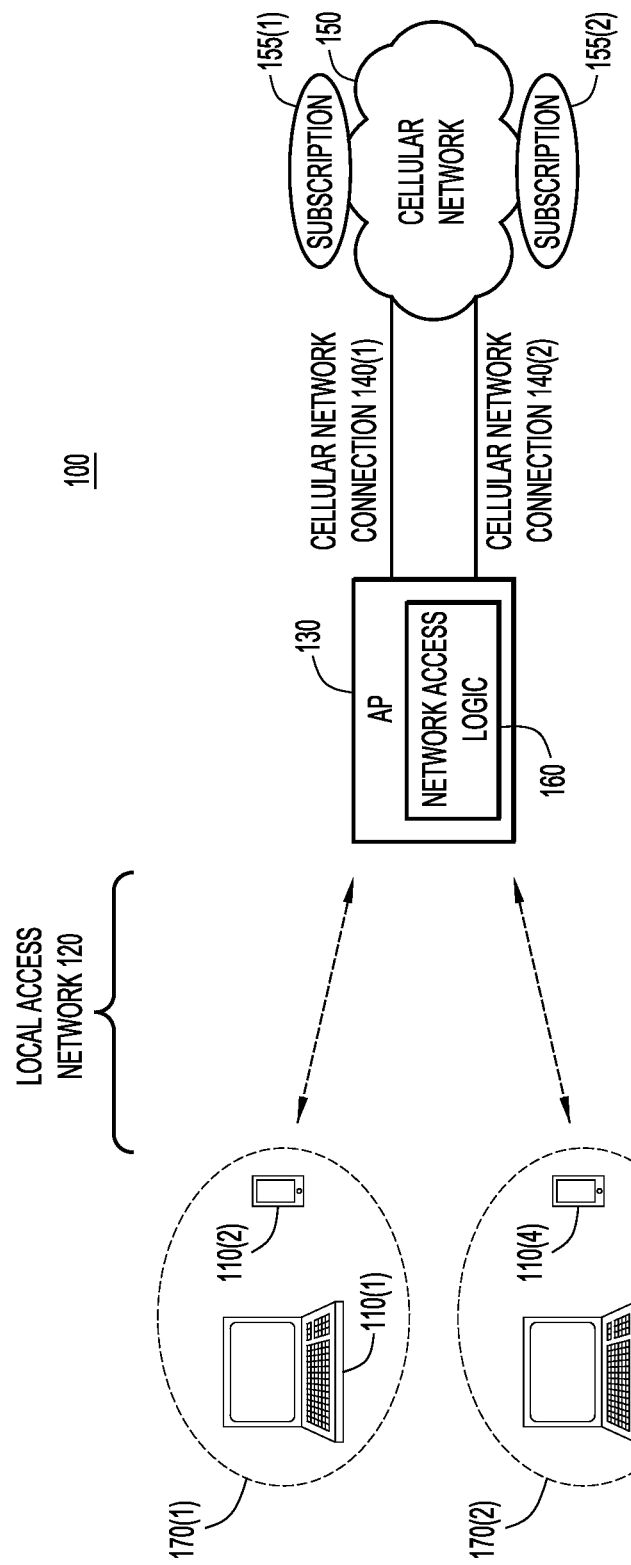
FIG. 1 illustrates a block diagram of a system configured to apply network policies on a per-user basis, according to an example embodiment.

FIG. 1 illustrates a block diagram of an example system 100 configured to provide cellular network access based on a local access network group. System 100 includes user devices 110(1)-110(4), local access network 120, AP 130, cellular network connections 140(1) and 140(2), and cellular network 150. System 100 may include any suitable environment in which techniques described herein may be implemented, such as a college/university campus, a coffee shop, an enterprise, or other environment where network connectivity is provided for multiple users.

User devices 110(1)-110(4) may be any suitable network-connected devices. For instance, user device 110(1) may be a laptop owned by a first user, user device 110(2) may be a smart phone owned by the first user, user device 110(3) may be a laptop owned by a second user, user device 110(4) may be a smart phone owned by the second user. Local access network 120 may be any suitable local access network, such as a Wireless Local Area Network (WLAN) (e.g., a Wi-Fi network) or a wired LAN (e.g., an Ethernet network).

AP 130 may be configured to obtain/provide network traffic from/to user devices 110(1)-110(4) over local access network 120. AP 130 may also be configured to obtain/provide network traffic from/to cellular network 150 over cellular network connections 140(1) and 140(2). AP 130 may be a mobile hotspot, an enterprise or managed Customer Premises Equipment (CPE), etc., and may provide Software Defined Wide Area Networking (SD-WAN) backup access. In one example, AP 130 may be a CPE configured to have local access network connectivity and cellular network connectivity.

Cellular network connections 140(1) and 140(2) may be any suitable cellular network connections, such as fifth generation cellular technology (5G) Protocol Data Unit (PDU) connections, and cellular network 150 may be any suitable cellular network, such as a 5G network that is part of a Wide Area Network (WAN). Cellular network 150 may be run by a Mobile Network Operator (MNO). Cellular network connections 140(1) and 140(2) may be WAN links, such as PDU connections, offered over the same or respective network slices. In one example, cellular network connections 140(1) and 140(2) may be different PDU connections on different network slices (e.g., one for each subscription) using a unique Subscriber Identification Module (SIM) profile for each subscription, or using a shared SIM profile for both subscriptions. In another example, cellular network connections 140(1) and 140(2) may be different PDU connections on the same network slice using a unique SIM profile for each subscription, or using a shared SIM profile for both subscriptions.

In one specific example, AP 130 may be a 5G CPE configured to provide Wi-Fi access to/from user devices 110(1)-110(4) over local access network 120, and 5G access to/from cellular network 150 over cellular network connections 140(1) and 140(2). It should be further understood that the operations described herein as being performed by AP 130 may be performed by another network entity or function between AP 130 and cellular network 150.

Taking the specific example in which system 100 includes a college/university campus, the first user and the second user may be student roommates. A MNO may offer multiple subscriptions associated with different network policy rules (e.g., network connection rates) to students. For example, the MNO may offer subscription 155(1) (also called a first subscription group) and subscription 155(2) (also called a second subscription group), where subscription 155(1) is associated with a standard network connection rate and subscription 155(2) is associated with a premium network connection rate. Cellular network connection 140(1) may provide network traffic at the standard network connection rate and cellular network connection 140(2) may provide network traffic at the premium network connection rate. In one example, the first user may be subscribed to the standard network connection rate and the second user may be subscribed to the premium network connection rate.

Network access logic 160 is provided on AP 130 to cause AP 130 to perform one or more operations to ensure that one or more network policies are applied on a per-user basis. In one example, AP 130 configures a first mapping of cellular network connection 140(1) to local access network group 170(1), and a second mapping of cellular network connection 140(2) to local access network group 170(2). Local access network group 170(1) may correspond to subscription 155(1), and local access network group 170(2) may correspond to subscription 155(2). Local access network groups 170(1) and 170(2) may be Service Set Identifier (SSID) groups.

Moreover, AP 130 may determine whether a given user device of user devices 110(1)-110(4) is authorized to use cellular network connection 140(1) or cellular network connection 140(2). For example, when the first user attempts to obtain network connectivity through user device 110(1) or 110(2), AP 130 may determine that user device 110(1) or 110(2) is authorized to use cellular network connection 140(1). This is because the first user is subscribed to subscription 155(1), and cellular network connection 140(1) is configured to provide network traffic for subscription 155(1) (e.g., at the standard rate). Similarly, when the second user attempts to obtain network connectivity through user device 110(3) or 110(4), AP 130 may determine that user device 110(3) or 110(4) is authorized to use cellular network connection 140(2).

If the given user device is authorized to use cellular network connection 140(1), AP 130 may associate, for the given user device, a first user device identifier (e.g., Internet Protocol (IP) address, Media Access Control (MAC) address, authenticated identifier, etc.) with local access network group 170(1). For example, AP 130 may allocate the first user device identifier to user device 110(1) or user device 110(2). Similarly, if the given user device is authorized to use cellular network connection 140(2), AP 130 may associate, for the given user device, a second user device identifier with local access network group 170(2). For example, AP 130 may allocate the second user device identifier to user device 110(3) or user device 110(4). In general, the AP 130 can identify any traffic received on a given SSID/Network ID using IEEE 802.11 access semantics/security procedures. Thus, if a user device connects to SSID-1 or SSID-2, the AP 130 can identify the traffic for that user device and that it was received on SSID-1 or SSID-2, and make the appropriate forwarding decision.

AP 130 may obtain network traffic from the given user device and determine whether the given user device is associated with local access network group 170(1) or 170(2) (e.g., based on whether the network traffic includes the user device identifier). If the given user device is associated with local access network group 170(1) (e.g., if the network traffic includes the first user device identifier), AP 130 may provide the network traffic over cellular network connection 140(1). If the given user device is associated with local access network group 170(2) (e.g., if the network traffic includes the second user device identifier), AP 130 may provide the network traffic over cellular network connection 140(2).

Thus, in a first example, AP 130 may obtain network traffic from user device 110(1) or user device 110(2), determine that the network traffic includes the first user device identifier (e.g., as a source IP address), and provide the network traffic over cellular network connection 140(1). In a second example, AP 130 may obtain network traffic from user device 110(3) or user device 110(4), determine that the network traffic includes the second user device identifier (e.g., as a source IP address), and provide the network traffic over cellular network connection 140(2). AP 130 may thereby apply/enforce network policies based on the relevant user. It will be appreciated that each of user devices 110(1)-110(4) may be assigned different respective IP addresses. The IP addresses assigned to user devices 110(1) and 110(2) may be on the same subnet such that user device 110(1) and user device 110(2) can reach each other via the local access network group 170(1) context defined by AP 130. For example, if user device 110(1) is a laptop and user device 110(2) is a Wi-Fi printer, the laptop may find the Wi-Fi printer and print without necessarily needing to be translated by the AP 130 binding to cellular network connection 140(1). Similar considerations may apply with respect to user devices 110(3) and 110(4).

Figure 2A:
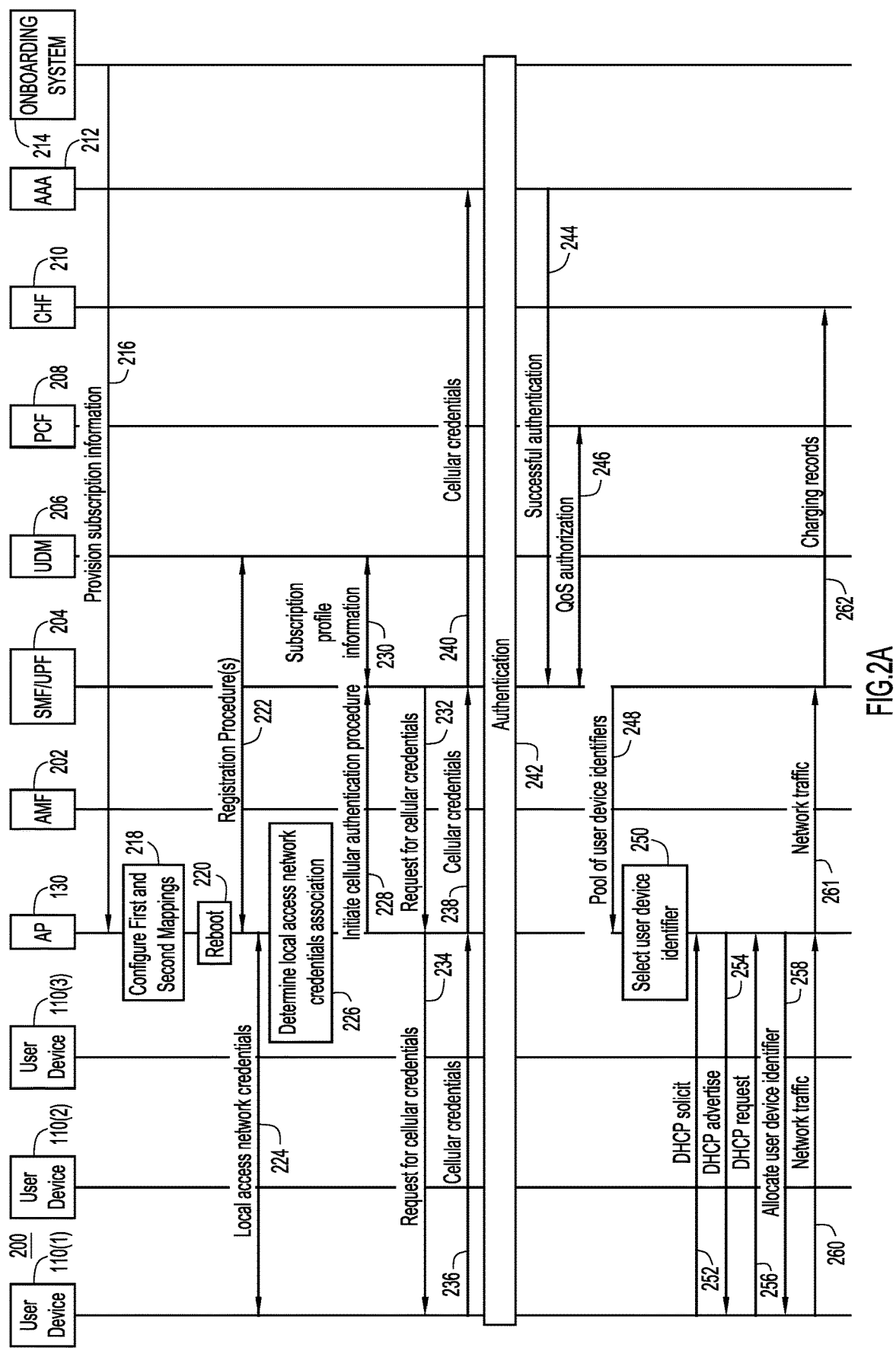
FIGS. 2A and 2B together illustrate a sequence diagram of a process for applying network policies on a per-user basis, according to an example embodiment.
Figure 2B:
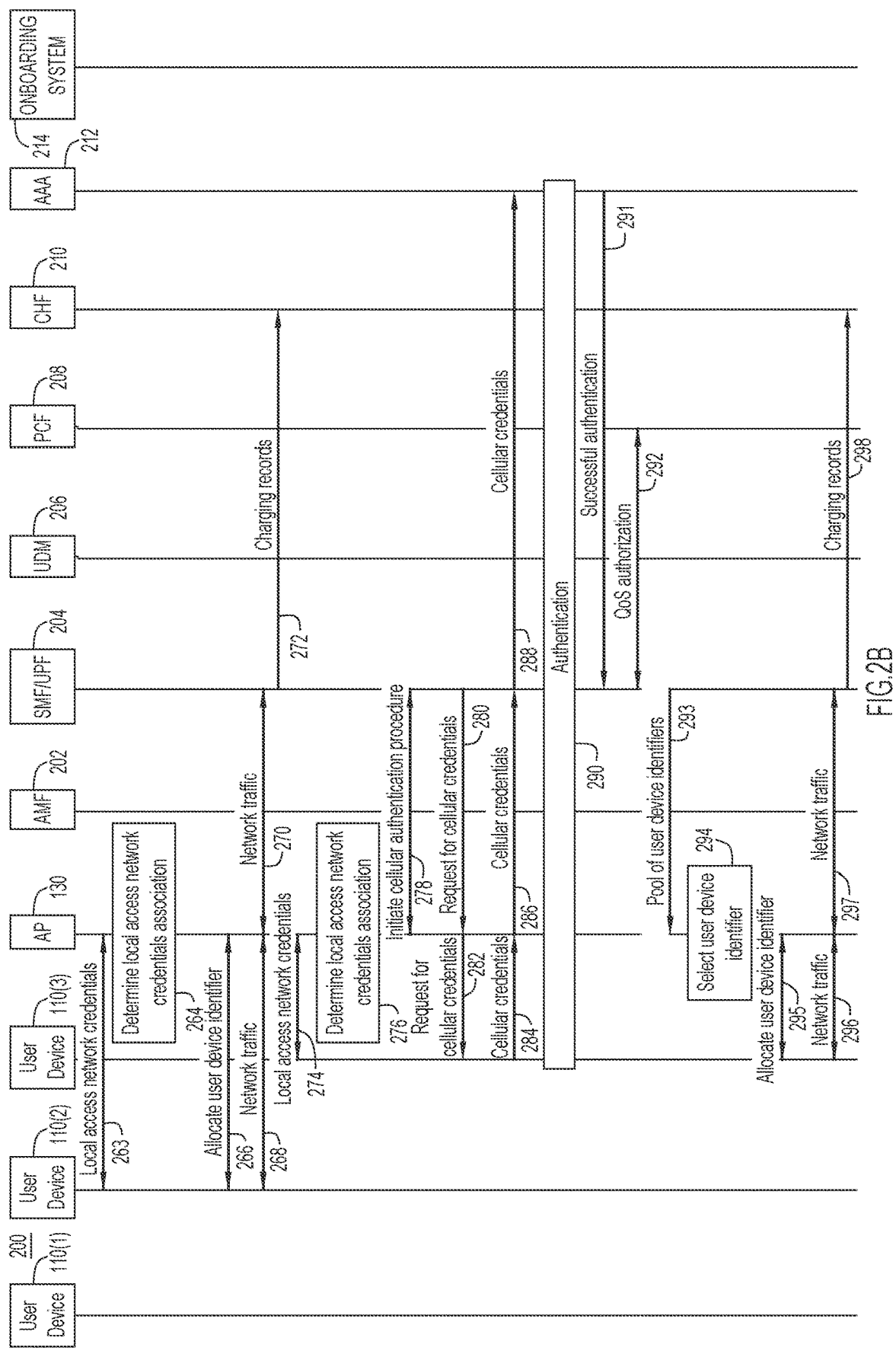

With continued reference to FIG. 1, FIGS. 2A and 2B together illustrate a sequence diagram of an example process 200 for applying network policies on a per-user basis. Process 200 involves operations between user devices 110 (1)-110(3), AP 130, Access and Mobility Management Function (AMF) 202, Session Management Function (SMF)/User Plane Function (UPF) 204, Unified Data Management (UDM) entity 206, Policy Control Function (PCF) 208, Charging Function (CHF) 210, Authentication, Authorization, and Accounting (AAA) server 212, and onboarding system 214. AMF 202, SMF/UPF 204, UDM entity 206, PCF 208, CHF 210, and AAA server 212 may belong to, or be part of, cellular network 150.

Initially, AP 130 may be deployed with a given International Mobile Equipment Identity (IMEI) for 4G scenarios or Permanent Equipment Identifier (PEI) for 5G scenarios. The MNO may sell two mobile subscriptions for AP 130 (e.g., corresponding to the first subscription and the second subscription discussed above). In one example, AP 130 is deployed with a single SIM profile corresponding to a given International Mobile Subscriber Identity (IMSI) for 4G scenarios or Subscription Permanent Identifier (SUPI) for 5G scenarios. In another example, AP 130 is configured with multiple SIM profiles. For instance, AP 130 may be configured with two SIM profiles corresponding to a first IMSI/SUPI (e.g., "SUPI 1") and a second IMSI/SUPI (e.g., "SUPI 2"), respectively. The SIM profile(s) may be stored on a SIM card, Universal SIM (USIM), embedded SIM (eSIM), Universal Integrated Circuit Card (UICC), etc.

At operation 216, onboarding system 214 provisions AP 130 with subscription information for the first and second subscriptions. The subscription information for the first subscription may include information for local access network group 170(1) (e.g., "SSID 1") and corresponding first group cellular user credentials/identifiers. The subscription information for the second subscription may include information for local access network group 170(2) (e.g., "SSID 2") and corresponding second group cellular user credentials/identifiers.

The first group cellular user credentials/identifiers may include a first Network Access Identifier (NAI) (e.g., "Group1@MNO.com"), and the second group cellular user credentials/identifiers may include a second NAI (e.g., "Group2@MNO.com"). The first group cellular user credentials/identifiers may be a common group identity for cellular network connection 140(1), rather than an individual Wi-Fi user identifier. The second group cellular user credentials/identifiers may be a common group identity for cellular network connection 140(2), rather than an individual Wi-Fi user identifier. If AP 130 is deployed with two SIM profiles, in one specific example AP 130 may include dual eSIM credentials, one associated with local access network group 170(1)/cellular network connection 140(1) and the other associated with local access network group 170(2)/cellular network connection 140(2). Optionally, the MNO may ship or otherwise provide the subscription information to AP 130.

At operation 218, AP 130 configures a first mapping of cellular network connection 140(1) to local access network group 170(1), and a second mapping of cellular network connection 140(2) to local access network group 170(2). If AP 130 is deployed with a single SIM profile, AP 130 may configure both the first mapping and the second mapping on that SIM profile. In particular, AP 130 may configure the first mapping on the SIM profile by configuring local access network group 170(1) mapped to cellular network connection 140(1) (e.g., "DNN1.MNO.com") as well as authorization credentials for the first NAI. AP 130 may further configure the second mapping on the same SIM profile by configuring local access network group 170(2) mapped to cellular network connection 140(2) (e.g., "DNN2.MNO.com") as well as the authorization credentials for the first NAI.

If AP 130 is deployed with two SIM profiles, AP 130 may configure the first mapping on the first SIM profile and the second mapping on the second SIM profile. In particular, AP 130 may configure the first mapping on the first SIM profile by configuring local access network group 170(1) mapped to cellular network connection 140(1) as well as authorization credentials for the first NAI. AP 130 may further configure the second mapping on the second SIM profile by configuring local access network group 170(2) mapped to cellular network connection 140(2) as well as authorization credentials for the second NAI. It will be appreciated that, regardless of whether AP 130 is deployed with one or two SIM profiles, the Data Network Name(s) (DNN(s)) (and/or network slice(s)) corresponding to local access network group 170(1) and/or local access network group 170(2) may be the same or different.

At operation 220, AP 130 reboots and, at operation 222, initiates one or more registration procedures with UDM entity 206. UDM entity 206 enables separate charging for cellular network connection 140(1) and cellular network connection 140(2). Specifically, UDM entity 206 is a data store that includes information to enable authorization for cellular network connection 140(1) and cellular network connection 140(2) (e.g., subscription information/credentials). If AP 130 is deployed with a single SIM profile, separate charging may be enabled for cellular network connection 140(1) and cellular network connection 140(2) using the single SIM profile. If AP 130 is deployed with two SIM profiles, charging information may be enabled for cellular network connection 140(1) using the first SIM profile and cellular network connection 140(2) using the second SIM profile.

A registration procedure may involve an exchange of registration information between AP 130 and UDM entity 206. The registration information may include applicable SIM profiles, allowed network slices (e.g., network slices corresponding to cellular network connection 140(1) and cellular network connection 140(2)), UE Route Selection Policies (URSPs), etc. If AP 130 is deployed with a single SIM profile, AP 130 may initiate one registration procedure in which the single SIM profile is exchanged along with the allowed network slices and URSPs. If AP 130 is deployed with two SIM profiles, AP 130 may initiate a first registration procedure in which the first SIM profile is exchanged along with the corresponding allowed network slice(s) and URSPs, and a second registration procedure in which the first SIM profile is exchanged along with the corresponding allowed network slice(s) and URSPs. Registration may take place between AP 130 and AMF 202.

At operation 224, user device 110(1) comes up and connects to AP 130 on local access network group 170(1). Specifically, AP 130 obtains local access network credentials (e.g., individual Wi-Fi user credentials/identifiers) from user device 110(1). User device 110(1) may be configured with Wi-Fi credentials associated with local access network group 170(1). In one example, user device 110(1) establishes an IEEE 802.11 association with AP 130, which performs a Wi-Fi access authentication (e.g., Wi-Fi Protected Access 2 (WPA2)) procedure to authenticate user device 110(1) or any other suitable access authentication technique(s)).

At operation 226, AP 130 determines whether the local access network credentials are associated with local access network group 170(1) or local access network group 170(2). In this case, AP 130 determines that user device 110(1) is attempting to use cellular network connection 140(1) because the local access network credentials are associated with local access network group 170(1), which is mapped to cellular network connection 140(1). AP 130 further determines whether cellular network connection 140(1) has already been established. In this example, AP 130 determines that cellular network connection 140(1) has not already been established.

At operation 228, AP 130 initiates a cellular authentication procedure for user device 110(1). It will be appreciated that AP 130 may initiate the cellular authentication procedure in response to AP 130 rebooting at operation 220, during user device 110(1) attachment to local access network group 170(1), or any time AP 130 is up (functional). In one example, AP 130 may send a PDU establishment request for cellular network connection 140(1) to SMF/UPF 204. The PDU establishment request may identify cellular network connection 140(1). The cellular authentication procedure may be any suitable cellular authentication procedure, such as SIM authentication (e.g., Extensible Authentication Protocol (EAP) or any suitable variation thereof such as 5G Authentication and Key Agreement (AKA) or EAP AKA in a 5G use case).

At operation 230, SMF/UPF 204 obtains, from UDM entity 206, subscription profile information for AP 130. The subscription profile information may include an indication that Data Network (DN) authentication is required, one or more Quality of Service (QoS) profiles, and an indication that separate charging is required for local access network group 170(1). If AP 130 is deployed with two SIM profiles, the subscription profile information may also include an indication that DN authentication is associated with the first SIM profile.

At operation 232, AP 130 obtains, from SMF/UPF 204, a request for cellular credentials (e.g., NAI) corresponding to cellular network connection 140(1) in accordance with the cellular authentication procedure. The request for cellular credentials may be an EAP identity request (e.g., an EAP request ID message related to user device 110(1)). At operation 234, AP 130 provides (e.g., relays/forwards) the request for the cellular credentials to user device 110(1). User device 110(1) may prompt the user to enter the cellular credentials (e.g., including a password), or the cellular credentials may be pre-stored on user device 110(1). At operation 236, AP 130 obtains the cellular credentials from user device 110(1). The cellular credentials may be included in an EAP identity response. At operation 238, AP 130 may provide (e.g., relay/forward) the cellular credentials to SMF/UPF 204. Thus, in one example, user device 110(1) may perform EAP negotiation, allowing the operator to verify that PDU creation for subscription 155(1) is validated by at least one user in local access network group 170(1). For instance, an EAP transaction may terminate on AP 130, and AP 130 may relay one or more EAP messages to user device 110(1).

As an alternative to operations 234 and 236, AP 130 may determine that the cellular credentials are locally stored (e.g., stored at AP 130) and provide the cellular credentials to SMF/UPF 204 without contacting user device 110(1). In one example, AP 130 may store one credential set for local access network group 170(1), and another credential set for local access network group 170(2). The cellular credentials may be used to initialize the binding of local access network group 170(1) to the cellular network connection 140(1). In either case, AP 130 may act as a UE from the point of view of cellular network 150 and participate in the cellular authentication procedure to permit secondary authentication of user device 110(1). In other words, AP 130 may appear to a service provider as an endpoint that is attempting to connect to cellular network 150 to obtain WAN connectivity. AP 130 may serve as a proxy for secondary authentication by performing the cellular authentication procedure on behalf of user device 110(1). In one example, Wi-Fi credentials of user device 110(1) may be used for the secondary authentication. Network policies may be applied based on proxying the cellular authentication procedure to user device 110(1). The secondary authentication procedure may be a 3GPP secondary authentication procedure whereby one or more network elements in cellular network 150 trigger a secondary authentication by sending an EAP identity request to AP 130. Thus, the mapping between cellular network connection 140(1) and local access network group 170(1) may be verified.

At operation 240, SMF/UPF 204 provides the cellular credentials to AAA server 212. AAA server 212 may associate cellular credentials with mobile subscriptions. Thus, subscription verification may occur through secondary authentication, for example in cases where the SIM credentials are shared across multiple tenants. AAA server 212 may include information associated with cellular network connection 140(1), including the cellular credentials, first authentication details, one or more first QoS policies, a first indication that separate charging is enabled, and first Packet Forwarding Control (PFC) rules. AAA server 212 may further include information associated with cellular network connection 140(2), including cellular credentials corresponding to cellular network connection 140(2), second authentication details, one or more second QoS policies, a second indication that separate charging is enabled, and second PFC rules.

AAA server 212 analyzes the cellular credentials and, at operation 242, authenticates user device 110(1). In one example, AAA server 212 may perform EAP authentication signaling by exchanging EAP authentication messages with user device 110(1). At operation 244, SMF/UPF 204 obtains, from AAA server 212, an indication that user device 110(1) was authenticated successfully. The indication may include attributes such as an EAP success notification, the relevant QoS profile(s) associated with the one or more first QoS policies, the first indication that separate charging is enabled, and the first PFC rules.

At operation 246, SMF/UPF 204 may perform QoS authorization with PCF 208 and obtain the relevant QoS profile(s) and charging rules for cellular network connection 140(1). SMF/UPF 204 may apply the attributes to the cellular network connection 140(1) (e.g., by adjusting one or more Virtual Routing and Forwarding (VRF) settings, an Access Control List (ACL), a plurality of services, etc.).

At operation 248, AP 130 obtains, from SMF/UPF 204, an indication of a first pool/block of user device identifiers associated with local access network group 170(1). The first pool of user device identifiers may include any IP addresses in an IP address prefix, or a subset thereof. AP 130 may further obtain, from SMF/UPF 204, an indication that cellular network connection 140(1) has been established. In one example, AP 130 may obtain a PDU establishment accept message indicating that a PDU connection has been established (e.g., by the MNO). In another example, the pool may be allocated by a local network. At operation 250, AP 130 selects a first user device identifier from the first pool of user device identifiers for allocation to user device 110(1). The user device identifier may be associated with local access network group 170(1).

Operations 252-258 may involve a Dynamic Host Configuration Protocol (DHCP) procedure. At operation 252, AP 130 obtains a DHCP solicit message from user device 110(1). At operation 254, AP 130 provides a DHCP advertise message to user device 110(1). At operation 256, AP 130 obtains a DHCP request from user device 110(1). At operation 258, AP 130 allocates the first user device identifier to user device 110(1). In one example, AP 130 may allocate the first user device identifier using a DHCP response.

At operation 260, AP 130 obtains network traffic from user device 110(1). AP 130 determines that the network traffic includes the first user device identifier (e.g., as a source IP address) and, at operation 261, provides the network traffic over cellular network connection 140(1) to SMF/UPF 204. At operation 262, SMF/UPF 204 sends, to CHF 210, charging records associated with cellular network connection 140(1). Charging may be differentiated and may be performed on a subscription basis (e.g., based on local access network group 170(1)).

At operation 263, user device 110(2) comes up and connects to AP 130 on local access network group 170(1).

Specifically, AP 130 obtains local access network credentials (e.g., individual Wi-Fi user credentials/identifiers) from user device 110(2). User device 110(2) may be configured with Wi-Fi credentials associated with local access network group 170(1). In one example, user device 110(2) establishes an IEEE 802.11 association with AP 130, which performs a Wi-Fi access authentication (e.g., WPA2) procedure to authenticate user device 110(2).

At operation 264, AP 130 determines whether the local access network credentials are associated with local access network group 170(1) or local access network group 170(2). In this case, AP 130 determines that user device 110(2) is attempting to use cellular network connection 140(1) because the local access network credentials are associated with local access network group 170(1), which is mapped to cellular network connection 140(1). AP 130 further determines whether cellular network connection 140(1) has already been established. In this example, AP 130 determines that cellular network connection 140(1) has already been established.

Because cellular network connection 140(1) has already been established, AP 130 bypasses the cellular authentication procedure for user device 110(2). AP 130 selects a second user device identifier from the first pool of user device identifiers for allocation to user device 110(2) and, at operation 266, allocates the second user device identifier to user device 110(2). In one example, AP 130 may allocate the second user device identifier in accordance with a DHCP procedure.

At operation 268, AP 130 obtains network traffic from user device 110(2). AP 130 determines that the network traffic includes the second user device identifier (e.g., as a source IP address). At operation 270, AP 130 provides the network traffic over cellular network connection 140(1) to SMF/UPF 204. At operation 272, SMF/UPF 204 sends, to CHF 210, charging records associated with cellular network connection 140(1). Charging may be differentiated and may be performed on a subscription basis (e.g., based on local access network group 170(1)).

In this example, user device 110(1) previously triggered the cellular authentication procedure to establish cellular network connection 140(1). User device 110(2) may subsequently use cellular network connection 140(1) without necessarily requiring another cellular authentication procedure, since cellular network connection 140(1) has already been established. Thus, AP 130 may perform a cellular authentication procedure for a first user device (e.g., user device 110(1)) that is attempting to use cellular network connection 140(1), but bypass the cellular authentication procedure for subsequent devices (e.g., user device 110(2)). User devices 110(1) and 110(2), which both belong to local access network group 170(1), may also communicate with each other without incurring cellular charges. User devices 110(1) and 110(2) may be authenticated before joining local access network group 170(1).

AP 130 may locally authenticate every user device that is attempting to use cellular network connection 140(1) based on local access network credentials, regardless of whether cellular network connection 140(1) has already been established. For example, AP 130 may perform IEEE 802.11 authentication based on individual Wi-Fi user credentials/identifiers for both user devices 110(1) and 110(2). Each user device may be authenticated on a local access network basis. AP 130 may further allocate, to any user devices (e.g., user devices 110(1) and 110(2)) attempting to use cellular network connection 140(1), respective user device identifiers from the first pool of user device identifiers.

At operation 274, user device 110(3) comes up and connects to AP 130 on local access network group 170(2). Specifically, AP 130 obtains local access network credentials (e.g., individual Wi-Fi user credentials/identifiers) from user device 110(3). User device 110(3) may be configured with Wi-Fi credentials associated with local access network group 170(2). In one example, user device 110(3) establishes an IEEE 802.11 association with AP 130, which performs a Wi-Fi access authentication (e.g., WPA2) procedure to authenticate user device 110(3).

At operation 276, AP 130 determines whether the local access network credentials are associated with local access network group 170(1) or local access network group 170(2). In this case, AP 130 determines that user device 110(3) is attempting to use cellular network connection 140(2) because the local access network credentials are associated with local access network group 170(2), which is mapped to cellular network connection 140(2). AP 130 further determines whether cellular network connection 140(2) has already been established. In this example, AP 130 determines that cellular network connection 140(2) has not already been established.

At operation 278, AP 130 initiates a cellular authentication procedure for user device 110(3). AP 130 may initiate the cellular authentication procedure because cellular network connection 140(2) has not yet been established. In one example, AP 130 may send a PDU establishment request for cellular network connection 140(2) to SMF/UPF 204. The PDU establishment request may identify cellular network connection 140(2). The cellular authentication procedure may be any suitable cellular authentication procedure, such as EAP or any suitable variation thereof.

At operation 280, AP 130 obtains, from SMF/UPF 204, a request for cellular credentials (e.g., NAI) corresponding to cellular network connection 140(2) in accordance with the cellular authentication procedure. The request for cellular credentials may be an EAP identity request. At operation 282, AP 130 provides (e.g., relays/forwards) the request for the cellular credentials to user device 110(3). User device 110(3) may prompt user to enter the cellular credentials (e.g., including a password), or the cellular credentials may be pre-stored on user device 110(3). At operation 284, AP 130 obtains the cellular credentials from user device 110(3). The cellular credentials may be included in an EAP identity response. At operation 286, AP 130 may provide (e.g., relay/forward) the cellular credentials to SMF/UPF 204.

As an alternative to operations 282 and 284, AP 130 may determine that the cellular credentials are locally stored (e.g., stored at AP 130) and provide the cellular credentials to SMF/UPF 204 without contacting user device 110(3). The cellular credentials may be used to initialize the binding of local access network group 170(2) to the cellular network connection 140(2). In either case, AP 130 may act as a UE and participate in the cellular authentication procedure to permit secondary authentication of user device 110(3). AP 130 may serve as a proxy for secondary authentication by performing the cellular authentication procedure on behalf of user device 110(3). In one example, Wi-Fi credentials of user device 110(3) may be used for the secondary authentication. Network policies may be applied based on proxying the cellular authentication procedure to user device 110(3).

At operation 288, SMF/UPF 204 provides the cellular credentials to AAA server 212. AAA server 212 analyzes the cellular credentials and, at operation 290, authenticates user device 110(3). In one example, AAA server 212 may perform EAP authentication signaling by exchanging EAP authentication messages with user device 110(3). At operation 291, SMF/UPF 204 obtains, from AAA server 212, an indication that user device 110(3) was authenticated successfully.

The indication may include attributes such as an EAP success notification, the relevant QoS profile(s) associated with the one or more second QoS policies, the second indication that separate charging is enabled, and the second PFC rules. At operation 292, SMF/UPF 204 may perform QoS authorization with PCF 208 and obtain the relevant QoS profile(s) and charging rules for cellular network connection 140(2). SMF/UPF 204 may apply the attributes to the cellular network connection 140(2) (e.g., by adjusting one or more VRF settings, an ACL, a plurality of services, etc.).

At operation 293, AP 130 obtains, from SMF/UPF 204, an indication of a second pool/block of user device identifiers associated with local access network group 170(2). The second pool of user device identifiers may include any IP addresses in an IP address prefix, or a subset thereof. AP 130 may further obtain, from SMF/UPF 204, an indication that cellular network connection 140(2) has been established. In one example, AP 130 may obtain a PDU establishment accept message indicating that a PDU connection has been established (e.g., by the MNO).

At operation 294, AP 130 selects a first user device identifier from the second pool of user device identifiers for allocation to user device 110(3). The user device identifier may be associated with local access network group 170(2). At operation 295, AP 130 allocates the first user device identifier to user device 110(3). In one example, AP 130 may allocate the first user device identifier in accordance with a DHCP procedure. Thus, AP 130 serves as a DHCP server for user devices 110(1)-110(3), allocating IP addresses associated with the appropriate local access network group based on information obtained from SMF/UPF 204. If AP 130 receives a first pool for a first PDU connection, AP 130 may allocate to all user devices in a first local access network group IP addresses from the first pool. If AP 130 receives a second pool for a second PDU connection, AP 130 may allocate to all user devices in a second local access network group IP addresses from the second pool.

At operation 296, AP 130 obtains network traffic from user device 110(3). AP 130 determines that the network traffic includes the first user device identifier (e.g., as a source IP address). At operation 297, AP 130 provides the network traffic over cellular network connection 140(2) to SMF/UPF 204. At operation 298, SMF/UPF 204 sends, to CHF 210, charging records associated with cellular network connection 140(3). Charging may be differentiated and may be performed on a subscription basis (e.g., based on local access network group 170(2)).

In the example of process 200, AP 130 determines that user devices 110(1), 110(2), and 110(3) are authorized to use cellular network connection 140(1) or cellular network connection 140(2). In another example, however, AP 130 may determine that a given user device is not authorized to use any cellular network connection. This may occur, for example, if incorrect cellular credentials are provided to AAA server 212 during the cellular authentication procedure or a subscription associated with the given user device has expired.

If the given user device is not authorized to use any cellular network connections, AP 130 may nonetheless authorize the given user device to use a given local access network based on local access network credentials obtained from the given user device. In this situation, AP 130 may ensure that the given user device can use the given local access network without permitting the given user device to use the cellular network connections.

In one example, AP 130 may associate, for the given user device, a user device identifier with the given local access network. The user device identifier may be an IP address selected from a local pool/block of user device identifiers associated with the given local access network group. The local pool of user device identifiers may facilitate access to the given local access network group but not any of the cellular network connections. The local pool of user device identifiers may include any IP addresses in an IP address prefix, or a subset thereof.

For instance, AP 130 may obtain network traffic from the given user device and determine that the network traffic includes the given user device identifier (e.g., as a source IP address). AP 130 may further provide the network traffic over the given local access network. This may allow the given user device to communicate with other user devices over the user device identifier.

Referring now to FIG. 3, a hardware block diagram is shown of a computing device 300 that may perform functions associated with operations discussed herein in connection with the techniques depicted in FIGS. 1, 2A, and 2B. In various embodiments, a computing device, such as computing device 300 or any combination of computing devices 300, may be configured as any entity/entities as discussed for the techniques depicted in connection with FIGS. 1, 2A, and 2B in order to perform operations of the various techniques discussed herein.

In at least one embodiment, computing device 300 may include one or more processor(s) 302, one or more memory element(s) 304, storage 306, a bus 308, one or more network processor unit(s) 310 interconnected with one or more network input/output (I/O) interface(s) 312, one or more I/O interface(s) 314, and control logic 320. In various embodiments, instructions associated with logic for computing device 300 can overlap in any manner and are not limited to the specific allocation of instructions and/or operations described herein. The control logic 320 may be configured to perform the aforementioned operations associated with the network access logic 160 referred to above in connection with FIG. 1.

In at least one embodiment, processor(s) 302 is/are at least one hardware processor configured to execute various tasks, operations and/or functions for computing device 300 as described herein according to software and/or instructions configured for computing device 300. Processor(s) 302 (e.g., a hardware processor) can execute any type of instructions associated with data to achieve the operations detailed herein. In one example, processor(s) 302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 304 and/or storage 306 is/are configured to store data, information, software, and/or instructions associated with computing device 300, and/or logic configured for memory element(s) 304 and/or storage 306. For example, any logic described herein (e.g., control logic 320) can, in various embodiments, be stored for computing device 300 using any combination of memory element(s) 304 and/or storage 306. Note that in some embodiments, storage 306 can be consolidated with memory elements 304 (or vice versa), or can overlap/exist in any other suitable manner.

In at least one embodiment, bus 308 can be configured as an interface that enables one or more elements of computing device 300 to communicate in order to exchange information and/or data. Bus 308 can be implemented with any architecture designed for passing control, data and/or information between processors, memory elements/storage, peripheral devices, and/or any other hardware and/or software components that may be configured for computing device 300. In at least one embodiment, bus 308 may be implemented as a fast kernel-hosted interconnect, potentially using shared memory between processes (e.g., logic), which can enable efficient communication paths between the processes.

In various embodiments, network processor unit(s) 310 may enable communication between computing device 300 and other systems, entities, etc., via network I/O interface(s) 312 to facilitate operations discussed for various embodiments described herein. In various embodiments, network processor unit(s) 310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 300 and other systems, entities, etc. to facilitate operations for various embodiments described herein. In various embodiments, network I/O interface(s) 312 can be configured as one or more Ethernet port(s), Fibre Channel ports, and/or any other I/O port(s) now known or hereafter developed. Thus, the network processor unit(s) 310 and/or network I/O interfaces 312 may include suitable interfaces for receiving, transmitting, and/or otherwise communicating data and/or information in a network environment.

I/O interface(s) 314 allow for input and output of data and/or information with other entities that may be connected to computing device 300. For example, I/O interface(s) 314 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 320 can include instructions that, when executed, cause processor(s) 302 to perform operations, which can include, but not be limited to, providing overall control operations of computing device 300; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 304 and/or storage 306 can store data, software, code, instructions (e.g., processor instructions), logic, parameters, combinations thereof, and/or the like used for operations described herein. This includes memory elements 304 and/or storage 306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 300 for transfer onto another computer readable storage medium.

Figure 4:
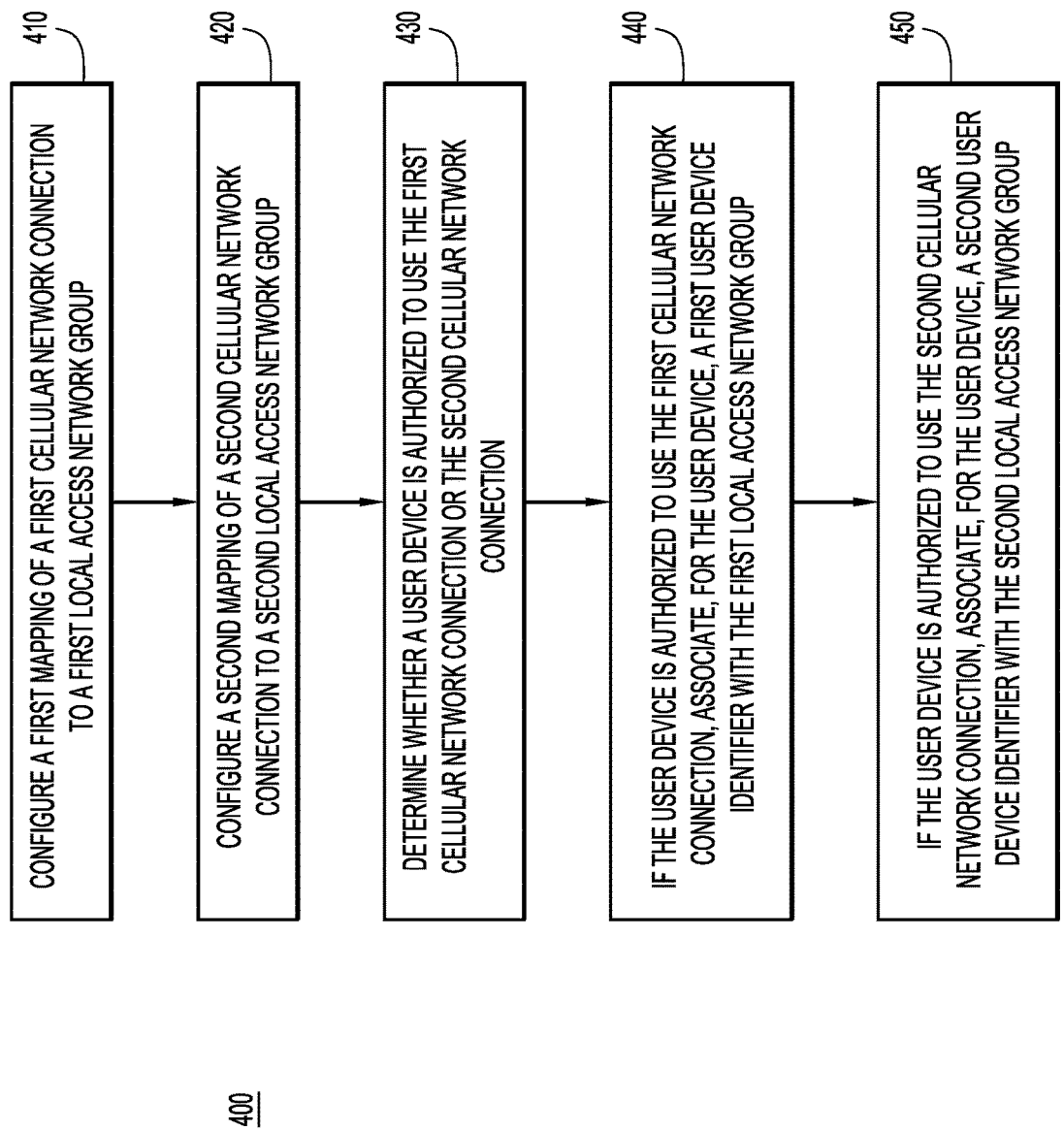
FIG. 4 illustrates a flowchart of a method for applying network policies on a per-user basis, according to an example embodiment.

FIG. 4 is a flowchart of an example method 400 for applying network policies on a per-user basis. Method 400 may be performed by any suitable entity, such as an AP (e.g., AP 130). At operation 410, the AP configures a first mapping of a first cellular network connection to a first local access network group. At operation 420, the AP configures a second mapping of a second cellular network connection to a second local access network group.

At operation 430, the AP determines whether a user device is authorized to use the first cellular network connection or the second cellular network connection. At operation 440, if the user device is authorized to use the first cellular network connection, the AP associates, for the user device, a first user device identifier with the first local access network group. At operation 450, if the user device is authorized to use the second cellular network connection, the AP associated, for the user device, a second user device identifier with the second local access network group.

Techniques described herein may enable an AP to partition a single WAN connection for multiple user groups. Differentiated services over a WAN link/PDU connection may be allowed on a user group basis. Authorization for usage may be performed based on the subscription credentials and charging may be enabled based on the data that the user group has actually used. Thus, distinct user groups may share an AP, with each group receiving a different level of service (e.g., based on QoS, network slice, etc.). These techniques may be implemented on a router to enable shared broadband services.

The techniques described herein may involve a number of aspects. In one aspect, a PDU connection may be activated when the first user of a Wi-Fi SSID group completes authentication (or for an Ethernet port with 802.1x authentication) on the local access network. In another aspect, after SIM authentication, the cellular network may identify the user group by triggering an EAP identity request from the network to the AP. In still another aspect, the AP may forward the received EAP identity request to the first user attached to the Wi-Fi network. In other words, the AP may relay an EAP request message received over cellular access to a Wi-Fi client over Wi-Fi access.

The AP may further request a set of delegated prefixes from the cellular network for allocation to Wi-Fi/Ethernet user devices. Ingress SSIDs may be programmatically linked to a dynamically created 3GPP PDU session, and group/subscription identity verification may be enforced. In this manner, the network behind the SSID may dynamically take on the identity of the Wi-Fi client. There is not necessarily a need to configure and manage the SSID, Access Point Name (APN), or slices on the AP, because the user devices that connect to the AP SSID may cause the network to modify the policies applied to the PDU. If cellular authentication fails, a local prefix may be allocated so as to avoid impact to the local connection.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any LAN, Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: configuring a first mapping of a first cellular network connection to a first local access network group; configuring a second mapping of a second cellular network connection to a second local access network group; determining whether a user device is authorized to use the first cellular network connection or the second cellular network connection; if the user device is authorized to use the first cellular network connection, associating, for the user device, a first user device identifier with the first local access network group; and if the user device is authorized to use the second cellular network connection, associating, for the user device, a second user device identifier with the second local access network group.

In one example, the method further comprises: obtaining network traffic from the user device; determining whether the user device is associated with the first local access network group or the second local access network group; based on the user device being associated with the first local access network group, providing the network traffic over the first cellular network connection; and based on the user device being associated with the second local access network group, providing the network traffic over the second cellular network connection.

In one example, the method further comprises: if it is determined that the user device is not authorized to use the first cellular network connection or the second cellular network connection: associating, for the user device, a third user device identifier with a local access network; obtaining network traffic from the user device; and providing the network traffic over the local access network.

In one example, the method further comprises: obtaining local access network credentials from the user device; determining whether the local access network credentials are associated with the first local access network group or the second local access network group; if the local access network credentials are associated with the first local access network group, determining that the user device is attempting to use the first cellular network connection; and if the local access network credentials are associated with the second local access network group, determining that the user device is attempting to use the second cellular network connection.

In one example, the method further comprises: determining that the user device is attempting to use a given cellular network connection of the first cellular network connection or the second cellular network connection, wherein: determining whether the user device is authorized to use the first cellular network connection or the second cellular network connection includes: determining whether the given cellular network connection has already been established; if the given cellular network connection has not already been established, initiating a cellular authentication procedure for the user device; and if the given cellular network connection has already been established, bypassing the cellular authentication procedure for the user device.

In a further example, the method further comprises: if the given cellular network connection has not already been established: obtaining, from a cellular network, a request for cellular credentials corresponding to the given cellular network connection in accordance with the cellular authentication procedure; providing the request for the cellular credentials to the user device; obtaining the cellular credentials from the user device; and providing the cellular credentials to the cellular network.

In a further example, the method further comprises: if the given cellular network connection has not already been established: obtaining, from a cellular network, a request for cellular credentials corresponding to the given cellular network connection in accordance with the cellular authentication procedure; determining that the cellular credentials are locally stored; and providing the cellular credentials to the cellular network.

In a further example, the method further comprises: if the given cellular network connection has not already been established: obtaining an indication of a pool of user device identifiers associated with a given local access network group of the first local access network group or the second local access network group.

In one example, the method further comprises: configuring the first mapping includes configuring the first mapping on a subscriber identification module profile; and configuring the second mapping includes configuring the second mapping on the subscriber identification module profile.

In one example, the method further comprises: configuring the first mapping includes configuring the first mapping on a first subscriber identification module profile; and configuring the second mapping includes configuring the second mapping on a second subscriber identification module profile.

In another form, an apparatus is provided. The apparatus comprises: a network interface configured to obtain or provide network communications; and one or more processors coupled to the network interface, wherein the one or more processors are configured to: configure a first mapping of a first cellular network connection to a first local access network group; configure a second mapping of a second cellular network connection to a second local access network group; determine whether a user device is authorized to use the first cellular network connection or the second cellular network connection; if the user device is authorized to use the first cellular network connection, associate, for the user device, a first user device identifier with the first local access network group; and if the user device is authorized to use the second cellular network connection, associate, for the user device, a second user device identifier with the second local access network group.

In another form, one or more non-transitory computer readable storage media are provided. The non-transitory computer readable storage media are encoded with instructions that, when executed by a processor, cause the processor to: configure a first mapping of a first cellular network connection to a first local access network group; configure a second mapping of a second cellular network connection to a second local access network group; determine whether a user device is authorized to use the first cellular network connection or the second cellular network connection; if the user device is authorized to use the first cellular network connection, associate, for the user device, a first user device identifier with the first local access network group; and if the user device is authorized to use the second cellular network connection, associate, for the user device, a second user device identifier with the second local access network group.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at an access point configured to communicate with a user device:
configuring a first mapping of a first cellular network connection to a first local access network group;
configuring a second mapping of a second cellular network connection to a second local access network group;
upon determining that the user device is authorized to use a given cellular network connection of the first cellular network connection or the second cellular network connection, the given cellular network connection is not established, and cellular credentials for the user device are stored at the access point, performing a cellular authentication procedure for the user device by proxy using the cellular credentials, without contacting the user device;
if the user device is authorized to use the first cellular network connection, associating, for the user device, a first user device identifier with the first local access network group;
if the user device is authorized to use the second cellular network connection, associating, for the user device, a second user device identifier with the second local access network group;
obtaining network traffic from the user device; and
upon determining that the user device is not authorized to use any of the first cellular network connection and the second cellular network connection, associating the user device with a local access network, and providing the network traffic over the local access network.

2. The method of claim 1, further comprising:
determining whether the user device is associated with the first local access network group or the second local access network group;
based on the user device being associated with the first local access network group, providing the network traffic over the first cellular network connection; and
based on the user device being associated with the second local access network group, providing the network traffic over the second cellular network connection.

3. The method of claim 1, further comprising:
upon determining that the user device is not authorized to use any of the first cellular network connection and the second cellular network connection, associating, for the user device, a third user device identifier with the local access network.

4. The method of claim 1, further comprising:
obtaining local access network credentials from the user device;
determining whether the local access network credentials are associated with the first local access network group or the second local access network group;
if the local access network credentials are associated with the first local access network group, determining that the user device is attempting to use the first cellular network connection; and
if the local access network credentials are associated with the second local access network group, determining that the user device is attempting to use the second cellular network connection.

5. The method of claim 1, further comprising:
determining that the user device is attempting to use the given cellular network connection;
upon determining the user device is authorized to use the given cellular network connection and the given cellular network connection is not established, initiating the cellular authentication procedure; and
upon determining the user device is authorized to use the given cellular network connection and the given cellular network connection is established, bypassing the cellular authentication procedure.

6. The method of claim 5, further comprising:
upon determining the given cellular network connection is not established and the cellular credentials are stored with the user device:
obtaining, from a cellular network, a request for cellular credentials corresponding to the given cellular network connection;
providing the request for the cellular credentials to the user device;
obtaining the cellular credentials from the user device; and providing the cellular credentials to the cellular network.

7. The method of claim 5, further comprising:
upon determining the given cellular network connection is not established and the cellular credentials are stored with the access point:
   obtaining, from a cellular network, a request for cellular credentials corresponding to the given cellular network connection in accordance with the cellular authentication procedure; and
   providing the cellular credentials to the cellular network.

8. The method of claim 5, further comprising:
upon determining the given cellular network connection is not established:
   obtaining an indication of a pool of user device identifiers associated with a given local access network group of the first local access network group or the second local access network group.

9. The method of claim 1, wherein:
configuring the first mapping includes configuring the first mapping on a subscriber identification module profile; and
configuring the second mapping includes configuring the second mapping on the subscriber identification module profile.

10. The method of claim 1, wherein:
configuring the first mapping includes configuring the first mapping on a first subscriber identification module profile; and
configuring the second mapping includes configuring the second mapping on a second subscriber identification module profile.

11. An apparatus comprising:
a network interface configured to obtain or provide network communications; and
one or more processors coupled to the network interface, wherein the one or more processors are configured to:
   configure a first mapping of a first cellular network connection to a first local access network group;
   configure a second mapping of a second cellular network connection to a second local access network group;
   upon determining that a user device is authorized to use a given cellular network connection of the first cellular network connection or the second cellular network connection, the given cellular network connection is not established, and cellular credentials for the user device are stored with the apparatus, perform a cellular authentication procedure for the user device by proxy using the cellular credentials, without contacting the user device;
   if the user device is authorized to use the first cellular network connection, associate, for the user device, a first user device identifier with the first local access network group;
   if the user device is authorized to use the second cellular network connection, associate, for the user device, a second user device identifier with the second local access network group;
   obtain network traffic from the user device; and
   upon determining that the user device is not authorized to use any of the first cellular network connection and the second cellular network connection, associate the user device with a local access network, and provide the network traffic over the local access network.

12. The apparatus of claim 11, wherein the one or more processors are further configured to:
   determine whether the user device is associated with the first local access network group or the second local access network group;
   based on the user device being associated with the first local access network group, provide the network traffic over the first cellular network connection; and
   based on the user device being associated with the second local access network group, provide the network traffic over the second cellular network connection.

13. The apparatus of claim 11, wherein the one or more processors are further configured to:
   upon determining that the user device is not authorized to use any of the first cellular network connection and the second cellular network connection, associate, for the user device, a third user device identifier with the local access network.

14. The apparatus of claim 11, wherein the one or more processors are further configured to:
   obtain local access network credentials from the user device;
   determine whether the local access network credentials are associated with the first local access network group or the second local access network group;
   if the local access network credentials are associated with the first local access network group, determine that the user device is attempting to use the first cellular network connection; and
   if the local access network credentials are associated with the second local access network group, determine that the user device is attempting to use the second cellular network connection.

15. The apparatus of claim 11, wherein the one or more processors are further configured to:
   determine that the user device is attempting to use the given cellular network connection;
   upon determining the user device is authorized to use the given cellular network connection and the given cellular network connection is not established, initiate the cellular authentication procedure; and
   upon determining the user device is authorized to use the given cellular network connection and the given cellular network connection is established, bypass the cellular authentication procedure.

16. One or more non-transitory computer readable storage media encoded with instructions that, when executed by a processor of an access point, cause the processor to:
   configure a first mapping of a first cellular network connection to a first local access network group;
   configure a second mapping of a second cellular network connection to a second local access network group;
   upon determining that a user device is authorized to use a given cellular network connection of the first cellular network connection or the second cellular network connection, the given cellular network connection is not established, and cellular credentials for the user device are stored at the access point, perform a cellular authentication procedure for the user device by proxy using the cellular credentials, without contacting the user device;
   if the user device is authorized to use the first cellular network connection, associating, for the user device, a first user device identifier with the first local access network group;

if the user device is authorized to use the second cellular network connection, associating, for the user device, a second user device identifier with the second local access network group;

obtaining network traffic from the user device; and upon determining that the user device is not authorized to use any of the first cellular network connection and the second cellular network connection, associating the user device with a local access network, and providing the network traffic over the local access network.

17. The one or more non-transitory computer readable storage media of claim 16, wherein the instructions further cause the processor to:

determine whether the user device is associated with the first local access network group or the second local access network group;

based on the user device being associated with the first local access network group, provide the network traffic over the first cellular network connection; and based on the user device being associated with the second local access network group, provide the network traffic over the second cellular network connection.

18. The one or more non-transitory computer readable storage media of claim 16, wherein the instructions further cause the processor to:

upon determining that the user device is not authorized to use any of the first cellular network connection and the second cellular network connection, associating, for the user device, a third user device identifier with the local access network.

19. The one or more non-transitory computer readable storage media of claim 16, wherein the instructions further cause the processor to:

obtain local access network credentials from the user device;

determine whether the local access network credentials are associated with the first local access network group or the second local access network group;

if the local access network credentials are associated with the first local access network group, determine that the user device is attempting to use the first cellular network connection; and if the local access network credentials are associated with the second local access network group, determine that the user device is attempting to use the second cellular network connection.

20. The one or more non-transitory computer readable storage media of claim 16, wherein the instructions further cause the processor to:

determine that the user device is attempting to use the given cellular network connection;

upon determining the user device is authorized to use the given cellular network connection and the given cellular network connection is not established, initiate the cellular authentication procedure; and upon determining the user device is authorized to use the given cellular network connection and the given cellular network connection is established, bypass the cellular authentication procedure.

* * * * *